(12) United States Patent
Mori et al.

(10) Patent No.: US 6,514,447 B1
(45) Date of Patent: Feb. 4, 2003

(54) VULCANIZING METHOD OF PNEUMATIC BIAS TIRE

(75) Inventors: Shinichi Mori, Hiratsuka (JP); Masaharu Sekoguchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 314 days.

(21) Appl. No.: 09/610,902

(22) Filed: Jul. 6, 2000

(30) Foreign Application Priority Data

Jul. 6, 1999 (JP) .......................................... 11-191197

(51) Int. Cl.$^7$ ................................................ B29C 33/04
(52) U.S. Cl. ........................................ 264/315; 264/326
(58) Field of Search .................. 264/315, 326; 425/35, 39

(56) References Cited

U.S. PATENT DOCUMENTS 6,382,285 B1 * 5/2002 Mori et al.

* cited by examiner

*Primary Examiner*—Mathieu D. Vargot
(74) *Attorney, Agent, or Firm*—Rader, Fishman & Grauer PLLC

(57) ABSTRACT

Disclosed is a vulcanizing method of a pneumatic bias tire having an aspect ratio Y of 25% or more and 55% or less from an unvulcanized tire, which comprises the step of expanding a rubber-made bladder from an inside of the unvulcanized tire in metallic molds, in which a bladder stretch ratio X of an outer diameter of the bladder when it is not expanded relative to a tire inner surface diameter, when the unvulcanized tire is pressed to the inner surfaces of the metallic molds by means of expansion of the bladder, is set in a range expressed by the following expression:

$$X = \beta - Y/\alpha,$$

where $0.37 < \alpha < 0.42$, $310 < \beta < 320$.

4 Claims, 9 Drawing Sheets

VULCANIZING METHOD OF PNEUMATIC BIAS TIRE

BACKGROUND OF THE INVENTION

The present invention relates to a vulcanizing method of a pneumatic bias tire, in which a shape of a rubber bladder for vulcanization is improved. More particularly, the present invention relates to a method optimal for vulcanizing a pneumatic bias tire having an aspect ratio of 25% or more and 55% or less.

Figure 7:
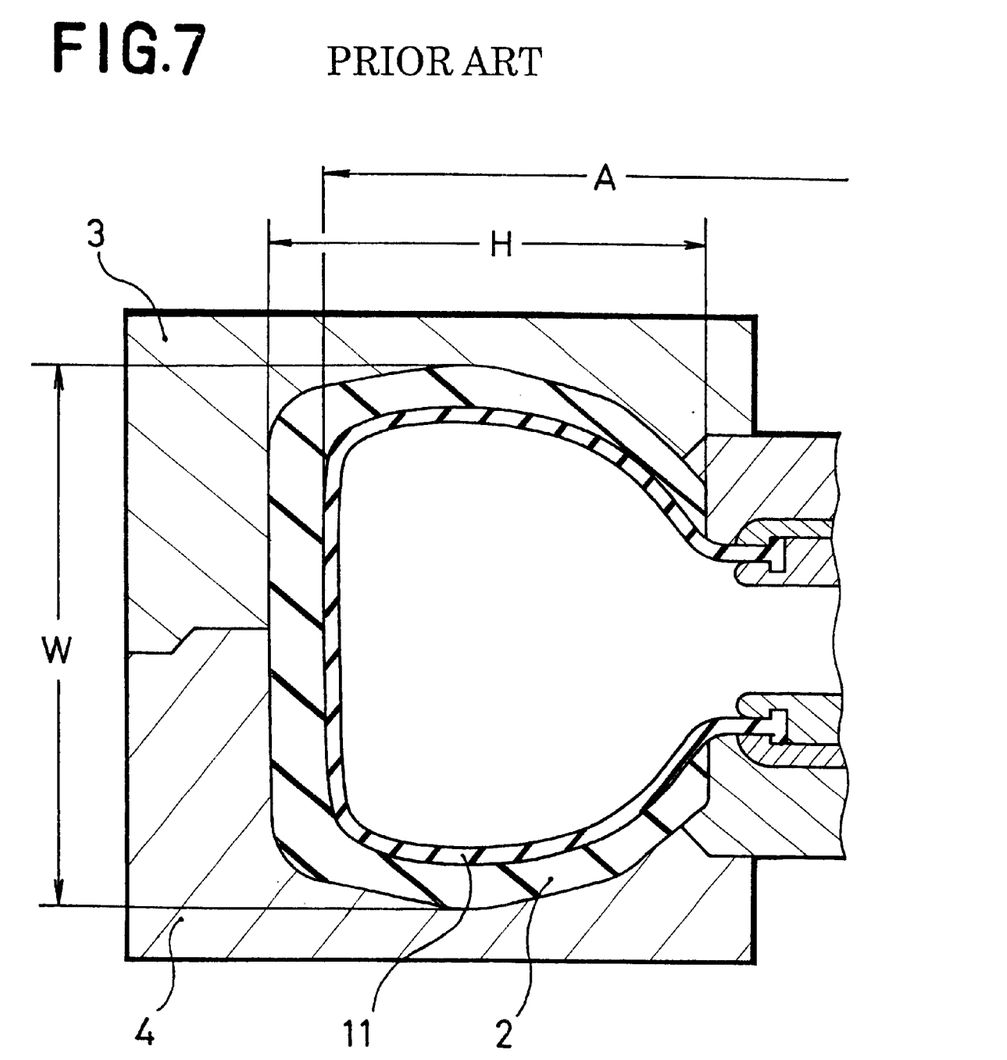
FIG. 7 is a partially enlarged cross sectional view showing the conventional vulcanizer for a pneumatic bias tire (having an aspect ratio of 60% or more).
Figure 8:
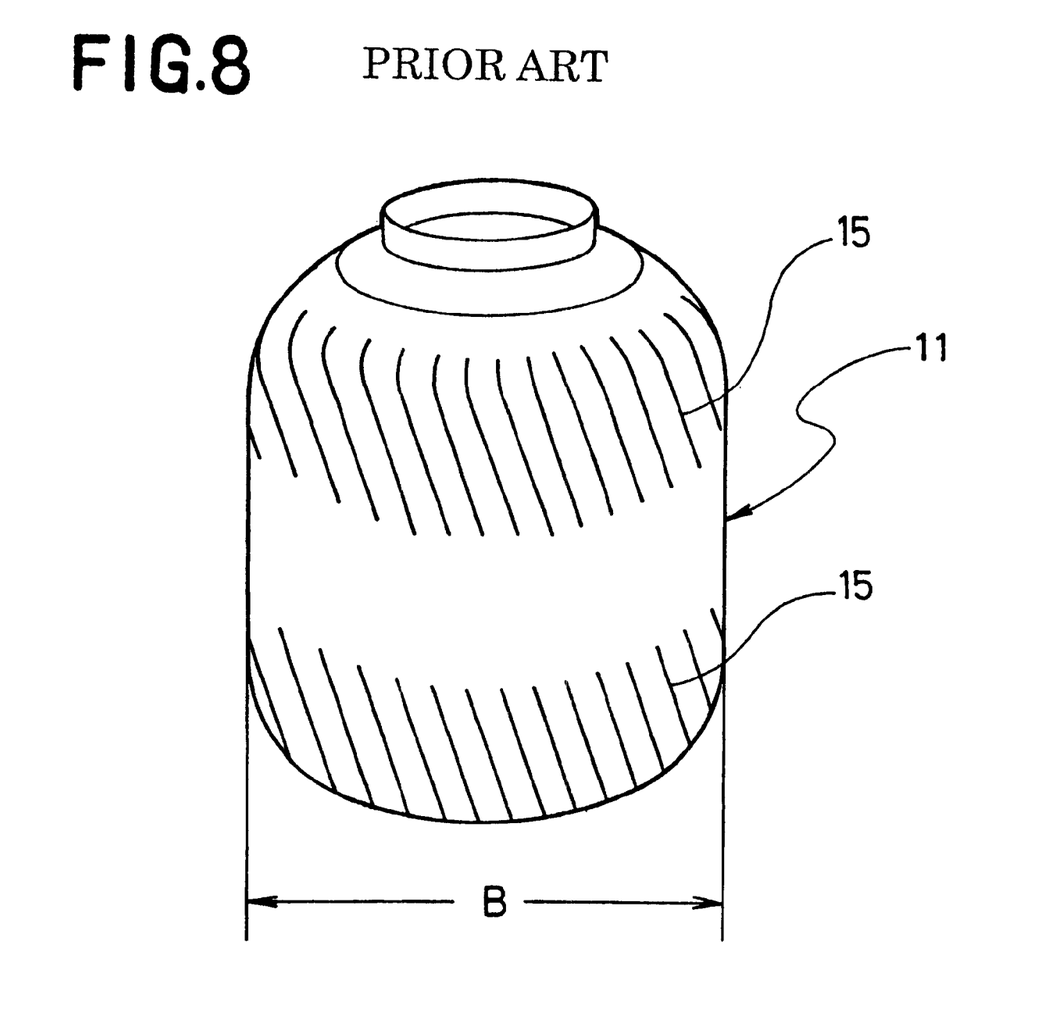
FIG. 8 is a perspective view showing the conventional bladder.

FIG. 7 is a view showing an example of the conventional vulcanizer for a pneumatic bias tire. As shown in FIG. 7, in the vulcanizer, an unvulcanized tire (green tire) 2 is inserted between upper and lower molds 3 and 4, expanded from the inside thereof by means of a rubber-made bladder 11, and pressed to the inner surfaces of the metallic molds 3 and 4 with a high pressure. Thus, vulcanization is performed for the unvulcanized tire 2. On the other hand, the rubber-made bladder 11 has a shape as shown in FIG. 8, when it is not expanded. In the vulcanizing method of a pneumatic bias tire using the tire vulcanizer as described above, it is important to close the molds after the unvulcanized tire 2 made to be cylindrical is expanded to a shape similar to profiles of the metallic molds by means of the expansion of the bladder 11, from the viewpoint of improving a non-defective ratio.

Figure 9:
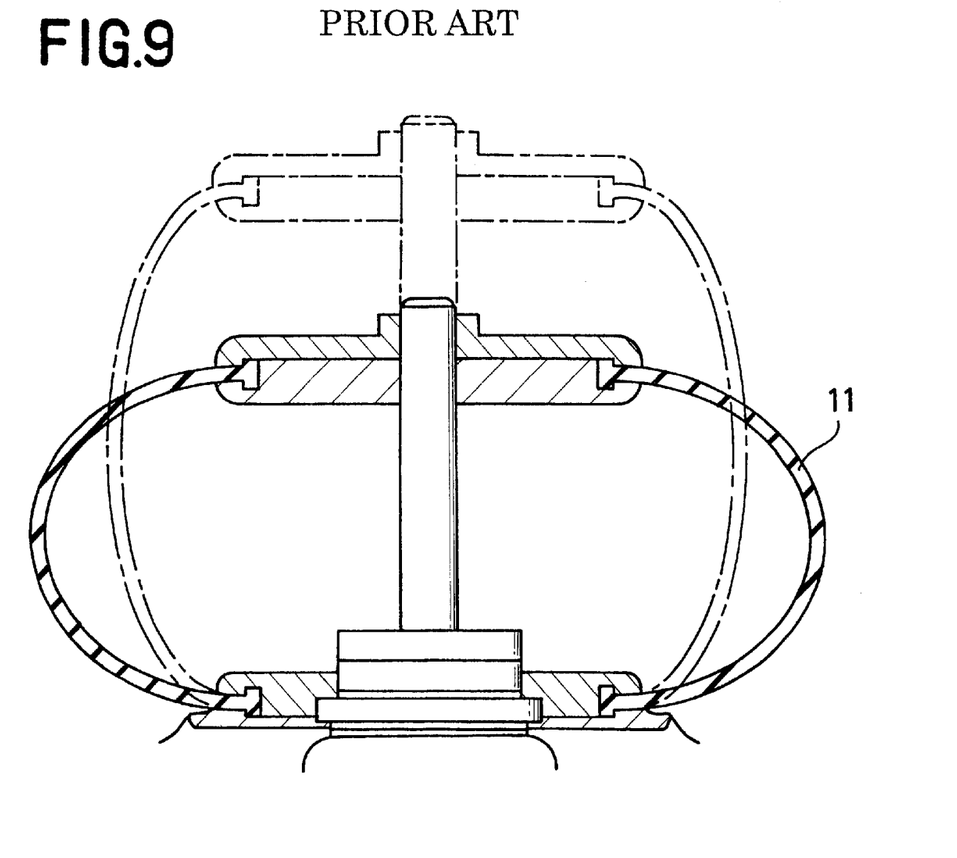
FIG. 9 is a cross sectional view showing the conventional bladder having an inner pressure load applied.

Heretofore, in the case of designing a bladder used for the tire vulcanizer, in order not to lower the number of vulcanizing steps that a single bladder can perform, that is, in order to maintain the bladder life for a long period of time, a value is set in a range approximately from 1.1 to 1.6, which is obtained by dividing a tire inner surface diameter A of an objective pneumatic bias tire by a bladder outer diameter B when the bladder is not expanded. The bladder outer diameter B relative to the tire inner surface diameter A is set in the above-described range, and the inside of the bladder is filled with a heating medium for vulcanization. Thus, as shown in FIG. 9, the bladder is expanded to a substantially spherical shape.

Figure 10:
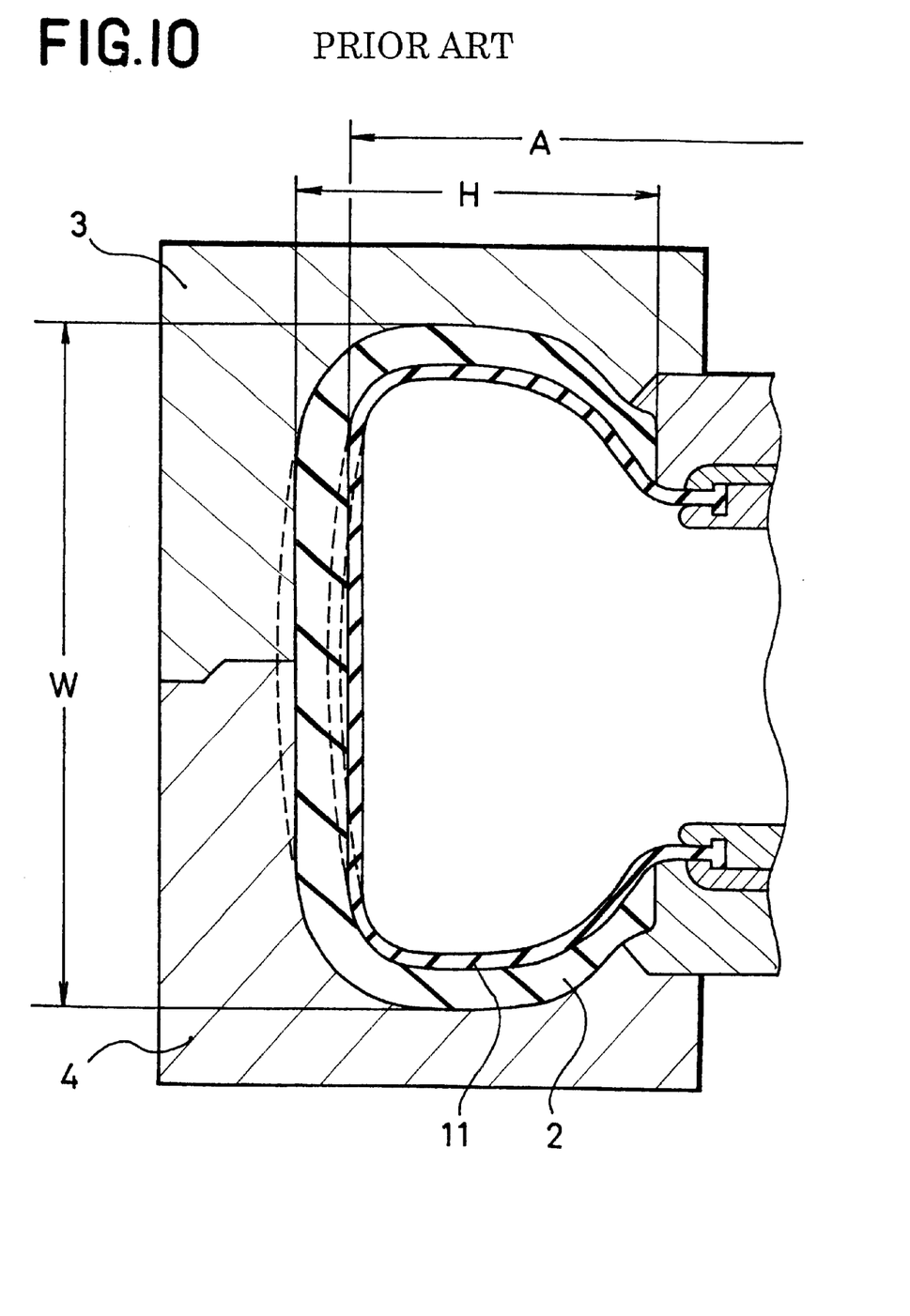
FIG. 10 is a partially enlarged cross sectional view showing the conventional vulcanizer for a pneumatic bias tire (having an aspect ratio of 55% or less).

In the case where a pneumatic bias tire having an aspect ratio of 60% or more is vulcanized by using the bladder as described above (FIG. 7), the profiles of the metallic molds and the shape of the bladder when it is expanded are approximately coincident with each other, thus enabling vulcanization with hardly causing a vulcanization defect and the like. However, in the case where vulcanization is performed for a pneumatic bias tire having an aspect ratio of 25% or more and 55% or less (FIG. 10), when the bladder 11 is expanded to a spherical shape as described above, in a state where the molds are open, a tread portion of the unvulcanized tire 2 exceeds a portion of the metallic molds for vulcanization which corresponds to a portion of the tire diameter, as shown by dotted lines in FIG. 10. The portion of the unvulcanized tire 2 exceeding as described above may be nipped between the upper and lower molds 3 and 4, thus tending to cause defects.

For this reason, in vulcanizing the pneumatic bias tire having an aspect ratio of 25% or more and 55% or less, the unvulcanized tire is expanded to only a little extent by means of the bladder, and the molds are closed while adjustment is performed so that the outer diameter of the unvulcanized tire cannot exceed the dimension of the metallic molds which corresponds to the tire outer diameter. However, in this case, since a tire side portion is not sufficiently expanded, a vulcanization defect has tended to occur in the tire side portion. Moreover, since an angle change of carcass cords does not become uniform, there has existed a problem that a great variation tends to occur in an outer diameter dimension of a product tire. Furthermore, since a transformation amount of the tire side portion inside the metallic molds is needed to be large, there has existed a problem that a bladder life is shortened due to a friction between the unvulcanized tire and the bladder.

Moreover, in the bladder for the tire vulcanizer, which is described above, for the purpose of improving a rubber flow in the metallic molds and of reducing an occurrence of vulcanization defects and a variation of the tire outer diameter dimension, a large number of vent grooves are arranged on the surface of the bladder, and air remaining between the unvulcanized tire and the surfaces of the metallic molds is removed through these vent grooves, as described in Japanese Patent application Kokai publication No. 6-143288. Specifically, as shown in FIG. 8, a large number of vent grooves 15 inclining relative to the tire diameter direction and extending linearly are arranged in parallel with each other on the surface of the bladder 11.

However, when the vent grooves 15 as described above are arranged on the surface of the bladder 11, the vent grooves 15 and the carcass cords interfere with each other, thus causing inconveniences such as a disorder of an end count of the carcass cords and an exposure of the carcass cords to the inner surface of the tire, which is caused by a phenomenon that the rubber of the carcass cords are drawn by the vent grooves 15. In particular, in a pneumatic bias tire for competition having a rim diameter of 4 to 6 inches and an extremely thin inner liner rubber, since a flow of the rubber of the carcass cords into the vent grooves is unavoidable, an inner liner gauge has had to be thicker than necessary. Moreover, when the vent grooves as described above are arranged on the surface of the bladder, the bladder life has tended to be shortened due to the friction between the unvulcanized tire and the bladder.

SUMMARY OF THE INVENTION

The object of the present invention is, in vulcanizing a pneumatic bias tire having an aspect ratio of 25% or more and 55% or less, to provide a vulcanizing method of the pneumatic bias tire, which is capable of reducing an occurrence of vulcanization defects and a variation of a diameter dimension, in which a nip of a tread portion of an unvulcanized tire into metallic molds is avoided, and a bladder life is not shortened.

Another object of the present invention is to provide a vulcanizing method of a pneumatic bias tire, which is capable of further reducing the occurrence of the vulcanization defects and the variation of the diameter dimension, in which a disorder of an end count of carcass cords per unit width and an exposure of the carcass cords to the inner surface of the tire are prevented, and air remaining between the unvulcanized tire and the inner surfaces of the metallic molds are removed well.

In order to achieve the foregoing object, the vulcanizing method of a pneumatic bias tire of the present invention, comprises the steps of: expanding a rubber-made bladder from the inside of the unvulcanized tire in the metallic molds; and vulcanizing the pneumatic bias tire having an aspect ratio Y of 25% or more and 55% or less from the unvulcanized tire, in which a bladder stretch ratio X of an outer diameter of the bladder when it is not expanded relative to a tire inner surface diameter, when the unvulcanized tire is pressed to the inner surfaces of the metallic molds by means of expansion of the bladder, is set in a range expressed by the following expression:

$$X = \beta - Y/\alpha,$$

where $0.37 < \alpha < 0.42$, $310 < \beta < 320$.

In the case where a relation is made between the bladder stretch ratio X and the aspect ratio of the tire Y as described above, in vulcanizing the pneumatic bias tire having an aspect ratio of 25% or more and 55% or less, the bladder follows the profile, particularly the shape of the side portion of the tire in the metallic molds in a state where the bladder is sufficiently expanded. Thus, a nip of a tread portion of an unvulcanized tire into the metallic molds and shortening of the bladder life due to a friction between the unvulcanized tire and the bladder are avoided. Accordingly, the occurrence of the vulcanization defects and the variation of the outer diameter dimension can be reduced.

In the present invention, it is preferable that vent grooves are arranged in an area where the surface of the bladder contacts at least a tire side portion, and a pattern of the vent grooves is made to be a mesh shape of a polygon (preferably, pentagon to dodecagon). By arranging the vent grooves having the polygonal mesh shape pattern as described above, air remaining between the unvulcanized tire and the inner surfaces of the metallic molds can be removed well, thus further reducing the occurrence of the vulcanization defects and the variation of the outer diameter. These vent grooves having the polygonal mesh shape pattern are hard to interfere with the carcass cords, thus preventing a disorder of an end count of the carcass cords and an exposure of the carcass cords. Moreover, even if the bladder stretch ratio X becomes larger, the vent grooves having the polygonal mesh shape pattern disperse a tensile strength uniformly, thus preventing a significant shortening of the bladder life.

Preferably, a groove width of the vent groove is set in a range from 2 to 5 mm, and a groove depth thereof is set in a range from 0.2 to 0.7 mm. By setting such dimensions, vulcanization can be performed even for the pneumatic tire having an extremely thin inner liner at a relatively low defect ratio.

As described above, with the vulcanizing method of a pneumatic bias tire of the present invention, a pneumatic bias tire for competition can be provided, which has an aspect ratio of 25% or more and 55% or less, and has preferably an extremely thin inner liner and a rim diameter of 4 to 6 inches, in which vulcanization defects and the like are very little and yield during vulcanization is good.

BRIEF DESCRIPTION OF THE DRAWINGS

For a more complete understanding of the present invention and the advantages thereof, reference is now made to the following description taken in conjunction with the accompanying drawings.

DETAILED DESCRIPTION OF THE PREFERRED EMBODIMENTS

Figure 1:
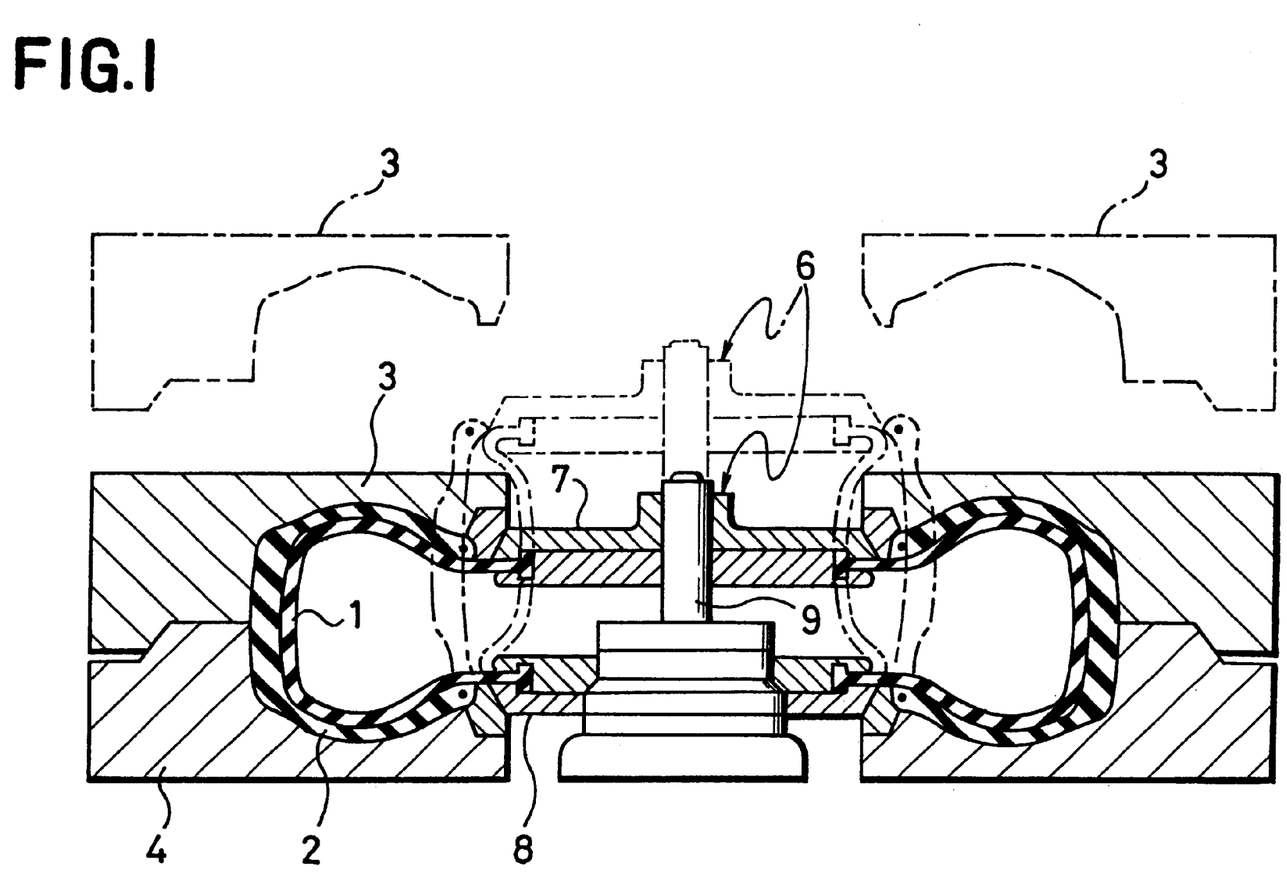
FIG. 1 is a cross sectional view showing the vulcanizer used for the vulcanizing method of a pneumatic bias tire according to an embodiment of the present invention.
Figure 2:
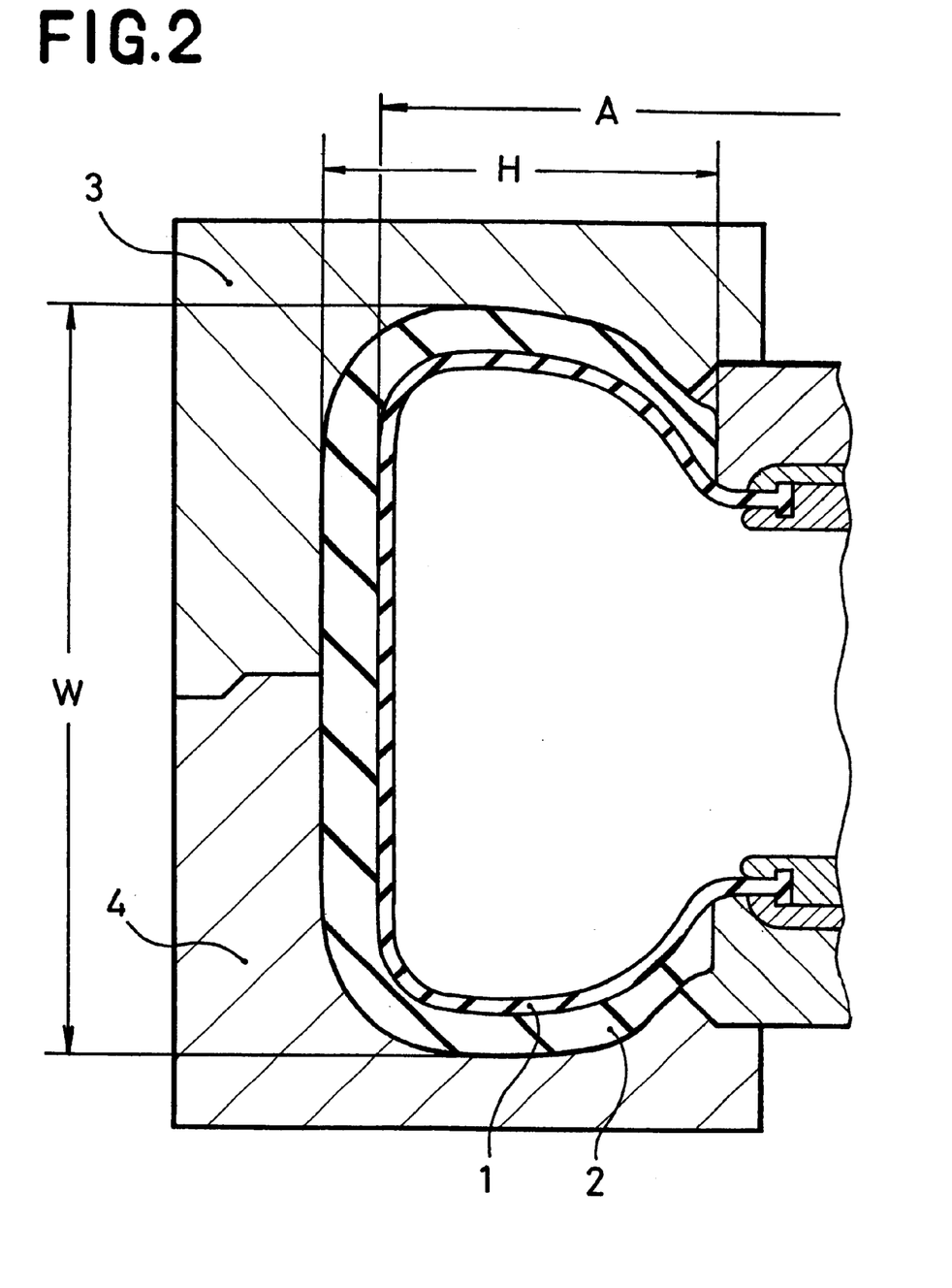
FIG. 2 is a partially enlarged cross sectional view of the vulcanizer of FIG. 1.

FIG. 1 is a cross sectional view exemplifying the vulcanizer used for the vulcanizing method of a pneumatic bias tire according to the embodiment of the present invention; FIG. 2 a partially enlarged cross sectional view thereof; and FIG. 3 a perspective view showing the bladder thereof.

As shown in FIGS. 1 and 2, in the tire vulcanizer of this embodiment, the unvulcanized tire 2 is inserted between the upper and lower molds 3 and 4, expanded from the inside thereof by means of the rubber-made bladder 1 arranged in the metallic molds, and pressed to the inner surfaces of the metallic molds 3 and 4 with a high pressure. Thus, vulcanization is performed. An expansion operation of the bladder 1 is operated by a center mechanism 6. The center mechanism 6 comprises a pair of disk-shaped grip members 7 and 8 arranged vertically for gripping the bladder 1, and a center axis 9 extending between the gripping members 7 and 8, and is adapted to adjust a mutual interval between the gripping members 7 and 8 with a slide of the center axis 9 in a vertical direction. Moreover, the center mechanism 6 comprises a not-shown heating medium supply line for supplying a heating medium inside of the bladder 1.

Figure 3:
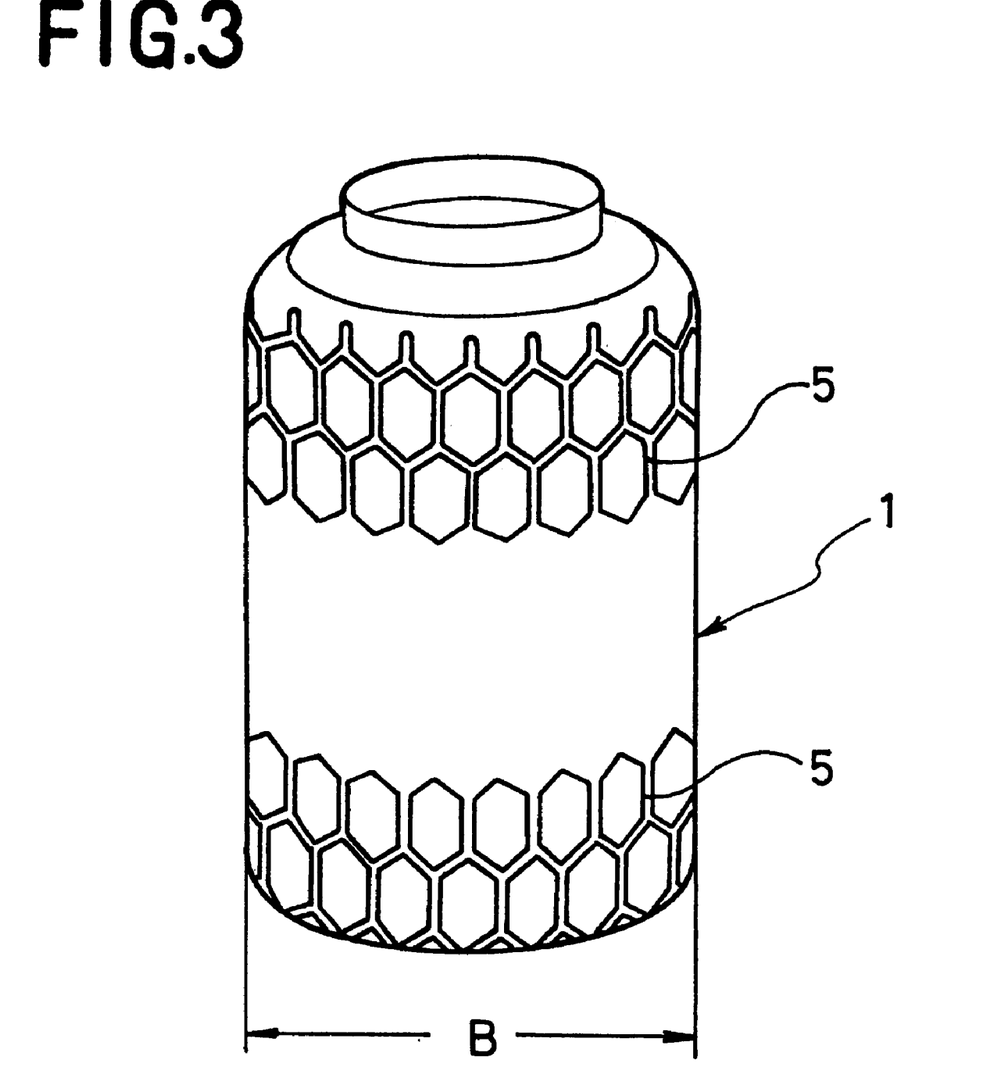
FIG. 3 is a perspective view showing the bladder used for the vulcanizer of FIG. 1.

On the other hand, the rubber-made bladder 1 has a shape as shown in FIG. 3 when it is not expanded. In an area of the surface of the bladder 1 contacting at least a tire side portion, vent grooves 5 having a mesh shape pattern of a polygon (regular hexagon in the drawing) are arranged.

In each of the drawings, a reference code A denotes a tire inner surface diameter, a code B a bladder outer diameter when it is not expanded, a code H a tire sectional height, and a code W a tire sectional width. Note that the bladder outer diameter B when it is not expanded stands for the metallic mold dimension of the bladder, and is substantially equal to the bladder outer diameter in a state where the bladder is installed in the center mechanism 6, but a pressure is not applied.

In the case where vulcanization is performed by using the tire vulcanizer constituted as above, as shown by dashed lines of FIG. 1, the upper mold 3 is made open relative to the lower mold 4, the center axis 9 of the center mechanism 6 is extended, and the unvulcanized tire 2 made to be cylindrical in a forming drum is inserted into the metallic molds. Next, by retracting the center axis 9 while supplying a heating medium inside the bladder 1, the bladder 1 is expanded to the tire diameter direction along with the unvulcanized tire 2. Then, the upper mold 3 is lowered downward to the lower mold 4 to complete fastening of the molds. Thereafter, vulcanization is performed according to a specified inner pressure and a specified vulcanization temperature.

The present inventors studied various bladder shapes to choose the optimal one for vulcanizing the pneumatic bias tire having an aspect ratio of 25% or more and 55% or less. As a result, the present inventors found, in order to reduce the vulcanization defects, that it was extremely important to set the bladder stretch ratio X (A/B×100), which is a ratio of the tire inner surface diameter A in the metallic molds relative to the bladder outer diameter B when it is not expanded, so as to have a relation with the aspect ratio Y (H/W×100), which is a ratio of the tire sectional height H relative to the tire sectional width W. Thus, the present inventors achieved the present invention.

Figure 4:
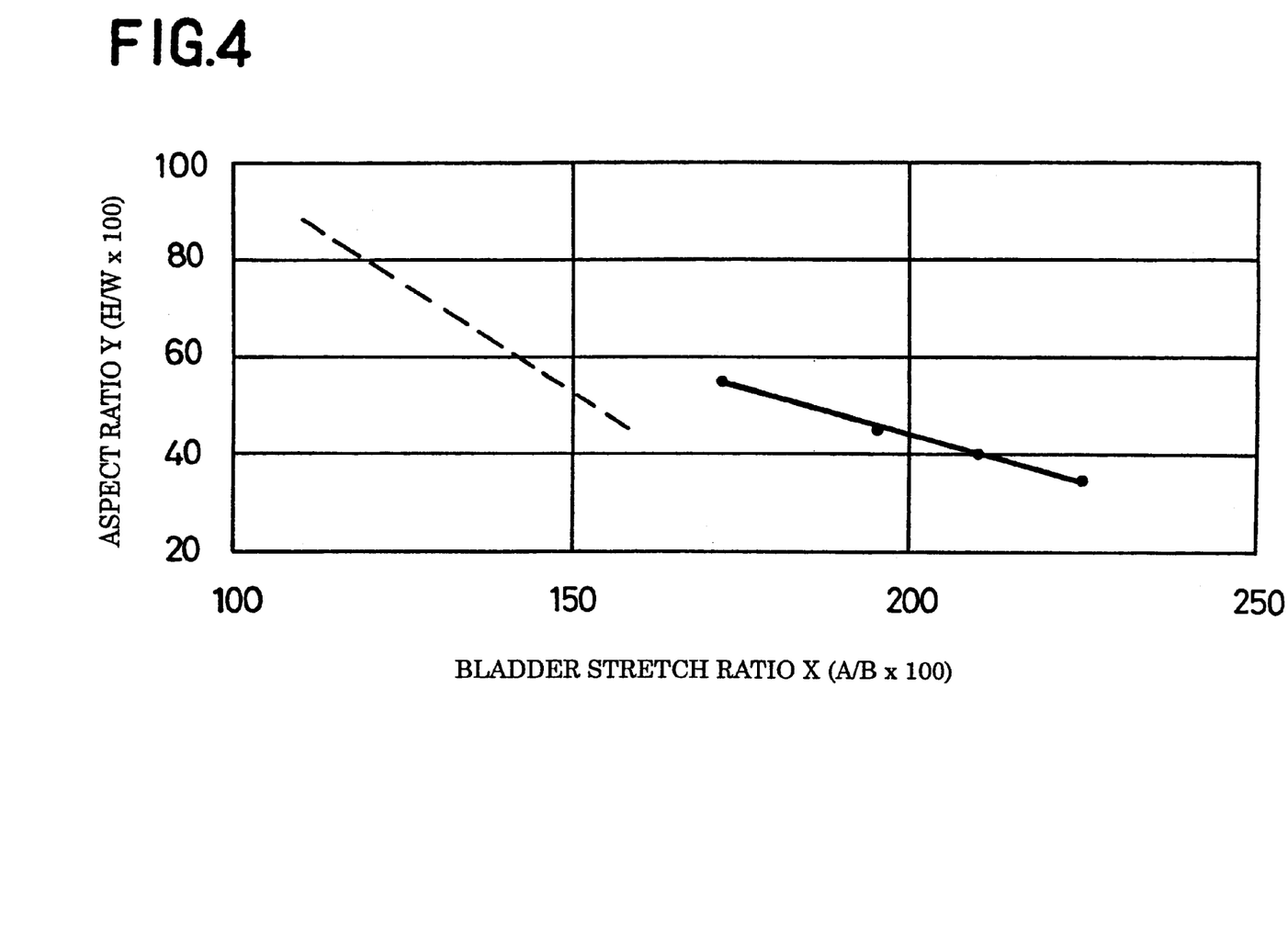
FIG. 4 is a graph showing a relation between the bladder stretch ratio X and the aspect ratio of the tire Y.

FIG. 4 is a graph showing combinations between various aspect ratios Y of bias tires and bladder stretch ratios X as plots when vulcanization is performed for the bias tires having the various aspect ratios by using various bladders for vulcanization, where the abscissa shows the bladder stretch ratio X and the ordinate shows the tire aspect ratio Y in the metallic mold dimension. In vulcanizing the bias tire having the aspect ratio Y of 25% or more and 55% or less, with the conventional knowledge, the bladder stretch ratio X was examined so as to be increased to some extent as the aspect ratio Y is lowered as shown by a dotted line of FIG. 4. However, in this case, there still occurred a large number of various vulcanization defects as described above.

On the contrary to this, as shown by a solid line of FIG. 4, the bladder stretch ratio X was set to be significantly larger than the conventional one in inverse proportion to the aspect ratio Y based on a specified relational expression, thus effectively reducing the vulcanization defects of the pneumatic bias tire having an aspect ratio of 25% or more and 55% or less. Specifically, by making a relation between the bladder stretch ratio X and the aspect ratio Y, expansion of the tread center portion can be regulated according to the aspect ratio Y. As a result, the tread center portion is hard to exceed the tire outer diameter in the metallic molds. Accordingly, the tread center portion becomes hard to be nipped between the upper mold 3 and the lower mold 4.

In the present invention, the relation between the bladder stretch ratio X and the aspect ratio Y is required to be set as the following expression (1):

$$X=\beta-Y/\alpha \qquad (1)$$

Note that, in the expression (1), the conditions are specified: $0.37<\alpha<0.42$; and $310<\beta<320$.

In the case where the pneumatic bias tire having an aspect ratio of 25% or more and 55% or less is vulcanized, a relation between the bladder stretch ratio X and the aspect ratio Y is set so as to be in accordance with the above expression (1), and the bladder stretch ratio X is set to be significantly larger as compared with the conventional one in a range of 170 to 230%. Thus, the bladder 1 follows the tire profile in the metallic molds in a state where the bladder 1 is sufficiently expanded. Accordingly, the tread portion of the unvulcanized tire 2 is not nipped between the upper and lower molds 3 and 4, and the shortening of the bladder life due to the friction between the bladder 1 and the unvulcanized tire 2 is avoided, thus reducing the occurrence of the vulcanization defect and the variation of the outer diameter dimension.

The above-described coefficient α is required to be more than 0.37 and less than 0.42. If this coefficient α is 0.37 or less, the stretch of the bladder becomes too small, and a pressure is hard to be uniformly applied to the tire inner surface. Thus, the uniformity of the tire tends to be damaged. On the contrary, if the coefficient α is 0.42 or more, the stretch of the bladder becomes too large, and the bladder life is shortened.

On the other hand, the above-described coefficient β is required to be more than 310 and less than 320. If this coefficient β is 310 or less, the stretch of the bladder becomes too small, and a pressure is hard to be uniformly applied to the tire inner surface. Thus, the uniformity of the tire tends to be damaged. On the contrary, if the coefficient β is 320 or more, the stretch of the bladder becomes too large, and the bladder life is shortened.

Furthermore, according to the present invention, the vent grooves 5 are arranged in the area where the surface of the bladder 1 contacts at least the tire side portion, and the pattern of the vent grooves 5 is made to be a mesh shape of a polygon. Thus, portions where the angle of the carcass cords are coincident with that of the vent grooves 5 are limited to be short, and the collapse of the carcass cords to the vent grooves 5 can be prevented. Accordingly, the variation of the end count of the carcass cords and the exposure of the carcass cords can be prevented, and the shortening of the bladder life due to the partial friction between the bladder 1 and the unvulcanized tire 2 can be avoided. At the same time, the extremely good air removing effect between the unvulcanized tire and the inner surfaces of the metallic molds can be obtained. Moreover, even if the bladder stretch ratio X becomes larger as compared with the conventional one, the vent grooves 5 having the polygonal mesh shape pattern disperse a tensile strength uniformly to reduce a local stress concentration to the bladder 1. As a result, the life of the bladder 1 also can be elongated. Preferably, the pattern of the above-described vent grooves 5 is a pentagon or more and a dodecagon or less. More preferably, the pattern is made in such a fashion that a regular polygon is repeated. By selecting such a polygon, the collapse of the carcass cords to the vent grooves 5 can be effectively prevented.

Figure 5:
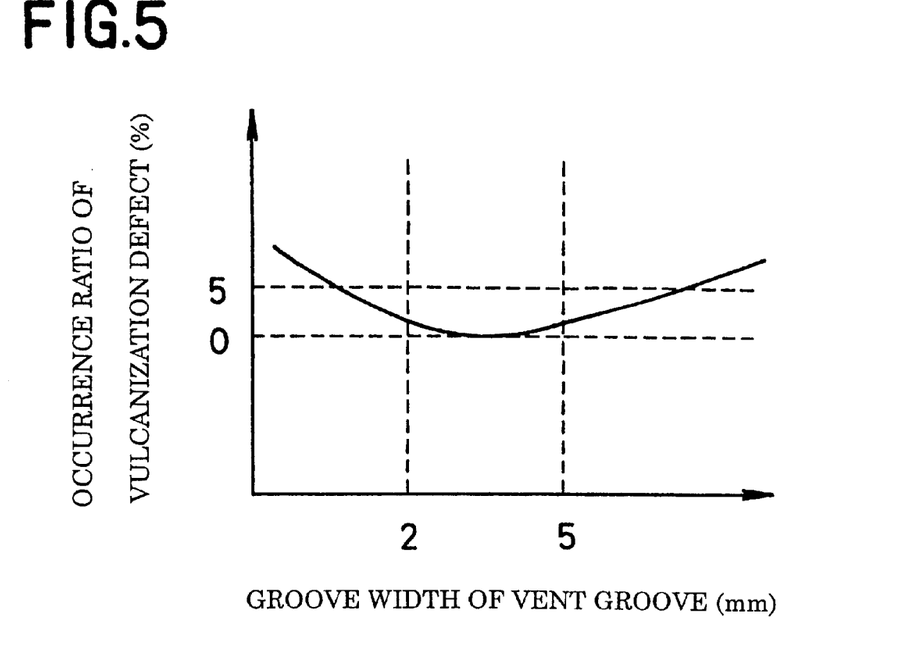
FIG. 5 is a graph showing a relation between a groove width of the vent grooves and an occurrence rate of the vulcanization defect.

FIG. 5 shows a relation between the groove width of the vent grooves and the occurrence ratio of the vulcanization defect (remaining air, exposure of the carcass cords and the like) occurred in the inner surface of the pneumatic bias tire. Note that the above-described relation is for the case where the groove depth of the vent grooves is fixed to 0.5 mm. As known from this FIG. 5, the occurrence ratio (%) of the vulcanization defect of the pneumatic bias tire greatly depends on the groove width of the vent grooves, and the occurrence of the vulcanization defects can be most effectively controlled when the groove width of the vent grooves ranges from 2 mm to 5 mm. Such a tendency can be obtained similarly in the case where the groove depth of the vent grooves are changed.

Figure 6:
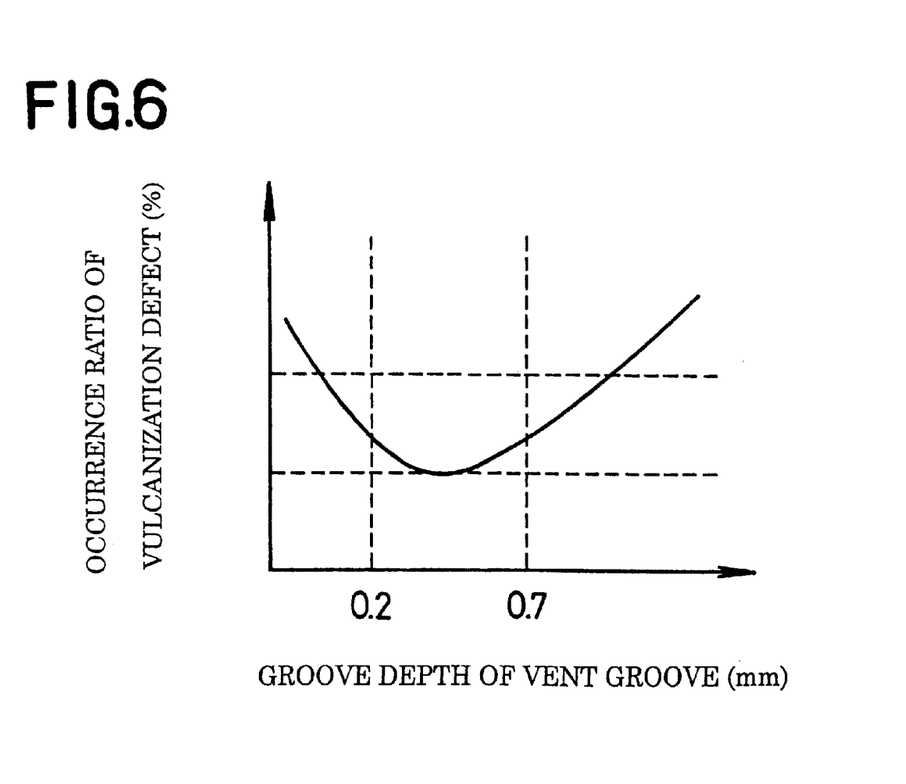
FIG. 6 is a graph showing a relation between a groove depth of the vent grooves and an occurrence rate of the vulcanization defect.

FIG. 6 shows a relation between the groove depth of the vent grooves and the occurrence ratio of the vulcanization defect (remaining air, exposure of the carcass cords and the like) occurred in the inner surface of the pneumatic bias tire. Note that the above-described relation is for the case where the groove width of the vent grooves is fixed to 3 mm. As known from this FIG. 6, the occurrence ratio (%) of the vulcanization defect of the pneumatic bias tire greatly depends on the groove depth of the vent grooves, and the occurrence of the vulcanization defects can be most effectively controlled when the groove depth of the vent grooves ranges from 0.2 mm to 0.7 mm. Such a tendency can be obtained similarly in the case where the groove width of the vent grooves are changed.

EXAMPLE

Vulcanization was performed by using the vulcanizing method of the present invention and the conventional vulcanizing method for a pneumatic bias tire for competition having an aspect ratio of 35% and the following constitution.

Tire size: 7.1×11.0-5
Target outer diameter: 280 mm
Tire pattern: slick (no groove)

Note that, in the tire size of the above-described pneumatic bias tire for competition, 7.1 denotes a contact width, 11.0 a tire outer diameter, and 5 a rim diameter, each of which is shown in inch.

In Table 1, test results are shown, which were obtained by performing the following test procedure. A bladder (Y=35, X=225) having a bladder diameter B of 115 mm and a bladder thickness of 7 mm was used in the tire vulcanizing method of the present invention. And, a bladder (Y=35, X=160) having a bladder diameter B of 160 mm and a bladder thickness of 7 mm is used in the conventional tire vulcanizing method. With both of the methods, fifty pieces of the above-described tires were respectively vulcanized. To the vulcanized tires, standard deviations of outer diameters were calculated as substitute values for the tire gauge variation and the carcass cord angle variation due to the nip between the upper and lower molds. According to Table 1, it can be understood that the tire vulcanized with the tire vulcanizing method of the present invention has a small outer diameter variation and is excellent in quality.

TABLE 1

|  | Number of vulcanized tires | Average value of tire outer diameter (mm) | Standard deviation (mm) |
| --- | --- | --- | --- |
| Vulcanizing method of the present invention | 50 | 278.5 | 1.1 |
| Conventional vulcanizing method | 50 | 278.3 | 1.9 |

In Table 2, test results are shown, which were obtained by performing the following test procedure. The bladder (Y=35, X=225) having a bladder diameter B of 115 mm and a bladder thickness of 7 mm was used in the tire vulcanizing method of the present invention. And, the bladder (Y=35, X=160) having a bladder diameter B of 160 mm and a bladder thickness of 7 mm was used in the conventional tire vulcanizing method. With both of the methods, fifty pieces of the above-described tires were respectively vulcanized. To the vulcanized tires, occurrence rates of the vulcanization defects (remaining air, exposure of the carcass cords and the like) occurred in the side portions of the pneumatic bias tires are compared with each other. According to Table 2, it can be understood that the tire vulcanized with the tire vulcanizing method of the present invention has less vulcanization defects and is excellent in quality.

TABLE 2

|  | Number of vulcanized tires | Occurrence ratio of vulcanization defect (%) |
| --- | --- | --- |
| Vulcanizing method of the present invention | 50 | 2 |
| Conventional vulcanizing method | 50 | 6 |

In Table 3, test results are shown, which were obtained by performing the following test procedure. The bladder (Y=35, X=225) having a bladder diameter B of 115 mm and a bladder thickness of 7 mm was used in the vulcanizing method of the present invention. In this case, vent grooves, each of which has a width of 3 mm and a depth of 0.5 mm on an area of the bladder surface contacting the tire from the side portion to the bead portion thereof, were made to be in a hexagonal mesh shape having a diameter of 2 cm. And, the bladder (Y=35, X=160) having a bladder diameter B of 160 mm and a bladder thickness of 7 mm was used in the conventional tire vulcanizing method. In this case, vent grooves, each of which has a width of 3 mm and a depth of 0.5 mm on the area of the bladder surface contacting the tire from the side portion to the bead portion thereof, were made to be linear in parallel with each other. With both of the methods, vulcanization was performed until the end of bladder lives. Herein, numbers of tires possible to be vulcanized are compared with each other, and occurrence rates of the vulcanization defects (remaining air, exposure of the carcass cords and the like) occurred in the inner liners of the pneumatic bias tires are compared with each other. Note that the numbers of the tires possible to be vulcanized are shown by indexes when the number in the conventional example is 100. According to Table 3, it can be understood that the bladder life with the tire vulcanizing method of the present invention is approximately equal to that with the conventional method, and that the tire vulcanized with the tire vulcanizing method of the present invention has less vulcanization defects and is excellent in quality.

TABLE 3

|  | Number of tires possible to be vulcanized (index) | Occurrence ratio of vulcanization defect (%) |
| --- | --- | --- |
| Vulcanizing method of the present invention | 98 | 4 |
| Conventional vulcanizing method | 100 | 8 |

As described above, according to employment of the tire vulcanizing method of the present invention, when vulcanization is performed for the pneumatic bias tire having an aspect ratio of 25% or more and 55% or less, the bladder follows the profile of the tire in the metallic molds. Thus, a nip of the tread portion of the unvulcanized tire into the metallic molds and shortening of the bladder life due to the friction between the unvulcanized tire and the bladder are avoided. Accordingly, the occurrence of the vulcanization defects and the variation of the outer diameter dimension can be reduced.

Moreover, when the vent grooves having a polygonal mesh shape pattern are arranged on the surface of the bladder, a disorder of an end count of the carcass cords and an exposure of the carcass cords can be prevented. Moreover, air remaining between the unvulcanized tire and the inner surfaces of the metallic molds can be removed well, thus reducing the occurrence of the vulcanization defects and the variation of the outer diameter.

Accordingly, even in the case where vulcanization is performed for the pneumatic bias tire for competition having an extremely thin inner liner and a rim diameter of 4 to 6 inches, the occurrence of the vulcanization defects can be suppressed to minimum to improve product yield.

Although the preferred embodiment of the present invention has been described in detail, it should be understood that various changes, substitutions and alternations can be made therein without departing from spirit and scope of the invention as defined by the appended claims.

What is claimed is:

1. A vulcanizing method of a pneumatic bias tire having an aspect ratio Y of 25% or more and 55% or less from an unvulcanized tire, the aspect ratio Y being a tire sectional height H divided by a tire sectional width W times 100%, the vulcanizing method comprising the step of:

expanding a rubber-made bladder from an inside of the unvulcanized tire in metallic molds, wherein a bladder stretch ratio X of a tire inner surface diameter when the unvulcanized tire is pressed to the inner surfaces of the metallic molds by means of expansion of the bladder relative to an outer diameter of the bladder when it is not expanded is set in a range expressed by the following expression:

$$X = \beta - Y/\alpha,$$

where $0.37 < \alpha < 0.42$, $310 < \beta < 320$.

2. The vulcanizing method of a pneumatic bias tire according to claim 1, wherein vent grooves are arranged on an area of a surface of the bladder, the area contacting at least a tire side portion, and a pattern of the vent grooves is made to be a polygonal mesh shape.

3. The vulcanizing method of a pneumatic bias tire according to claim 2, wherein a groove width of each vent groove is set in a range from 2 to 5 mm, and a depth thereof is set in a range from 0.2 to 0.7 mm.

4. The vulcanizing method of a pneumatic bias tire according to claim 1, wherein the pneumatic bias tire is a tire for competition, the tire having a rim diameter of 4 to 6 inches.

* * * * *